United States Patent
Sharma et al.

(10) Patent No.: US 12,026,672 B2
(45) Date of Patent: Jul. 2, 2024

(54) MANAGING A COLLABORATIVE WORKSPACE TO IDENTIFY RELEVANT ACTIVITIES AND PRESENT THE RELEVANT ACTIVITIES TO A USER

(71) Applicant: Microsoft Technology Licensing, LLC, Redmond, WA (US)

(72) Inventors: Manoj Sharma, Winchester, MA (US); Simoune Rebekah Morena Valerio Lucas, Seattle, WA (US); Douglas Lane Milvaney, Winchester, MA (US); Manish Kumar Shukla, Lexington, MA (US); Nathan Darrel Kile, Jr., Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 174 days.

(21) Appl. No.: 17/589,219

(22) Filed: Jan. 31, 2022

(65) Prior Publication Data
US 2023/0138836 A1 May 4, 2023

Related U.S. Application Data

(60) Provisional application No. 63/273,047, filed on Oct. 28, 2021.

(51) Int. Cl.
*G06Q 10/10* (2023.01)
(52) U.S. Cl.
CPC ........... *G06Q 10/103* (2013.01); *G06Q 10/10* (2013.01)
(58) Field of Classification Search
CPC .............................. G06Q 10/103; G06Q 10/10
See application file for complete search history.

(56) References Cited

U.S. PATENT DOCUMENTS

| 8,543,926 | B2 | 9/2013 | Giles |
| 2011/0264611 | A1* | 10/2011 | Graupner .............. G06Q 10/10 715/708 |
| 2012/0278388 | A1 | 11/2012 | Kleinbart et al. |

(Continued)

FOREIGN PATENT DOCUMENTS

CN 102119398 B * 12/2014 ............. G06Q 10/10

OTHER PUBLICATIONS

"International Search Report and Written Opinion Issued in PCT Application No. PCT/US22/041435", dated Nov. 23, 2022, 11 Pages.

*Primary Examiner* — Florian M Zeender
*Assistant Examiner* — Emily M. Kraisinger
(74) *Attorney, Agent, or Firm* — NovoTechIP International PLLC

(57) ABSTRACT

A computing device for organizing a collaborative workspace for a user implements providing, using a display of the computing device, an interactive user interface associated with the collaborative workspace in which the user may work on a shared task in a coordinated fashion with other users; identifying, based on one or more factors, one or more activities specific to the user from within the collaborative workspace; assigning the identified one or more activities to a catch-up list associated with the user; displaying, within the interactive user interface, the catch-up list; detecting that at least one of the one or more activities has been addressed from within the collaborative workspace or the catch-up list; and updating, based on the detection, the collaborative workspace and the catch-up list.

20 Claims, 7 Drawing Sheets

(56) References Cited

U.S. PATENT DOCUMENTS

2014/0298207 A1   10/2014  Ittah et al.
2017/0177182 A1    6/2017  Wong et al.
2018/0321889 A1   11/2018  Harris et al.
2021/0097120 A1*  4/2021  Gutierrez ................ G06F 16/14

* cited by examiner

MANAGING A COLLABORATIVE WORKSPACE TO IDENTIFY RELEVANT ACTIVITIES AND PRESENT THE RELEVANT ACTIVITIES TO A USER

CROSS-REFERENCE TO RELATED APPLICATIONS

This application claims the benefit of priority from U.S. Provisional Patent Application Ser. No. 63/273,047, filed on Oct. 28, 2021, and entitled "MANAGING A COLLABORATIVE WORKSPACE TO IDENTIFY RELEVENT ACTIVITS AND PRESENT THEM TO A USER."

BACKGROUND

A collaborative workspace refers to functionality that allows individuals to work on a shared task for a project in a coordinated fashion. A typical workspace may define permissions that, for example, identify a collection of members/users who are permitted to interact with the workspace. The permissions may also define the manner in which the respective users are permitted to interact with the workspace. The workspace may also commonly define a collection of items (e.g., documents, presentations, spreadsheets, etc.) associated with the workspace. In operation, authorized members may engage with the workspace (in a manner defined by the permissions) to work on the shared items in a coordinated fashion.

Users may add items to and/or remove items from the workspace. If a user is interested in accessing items stored in different repositories, they may find it requires the use of multiple different access tools or applications. In current collaborative workspace environments, there is no notion of allowing a user to seamlessly switch between different tasks in various groups the user may be associated with, provide comments about content that is shared in the workspace and have conversations about the content.

Collaborators may be actively working on multiple projects, which may be in various lifecycle stages. As a result, a collaborator may struggle to keep track of the state of these documents and the various contributions that have been made to these documents by other collaborators. This may lead to frustration and inefficiency, as the collaborator struggles to keep track of which documents may require the attention of the collaborator. Hence, there is a need for improved systems and methods of intelligently tracking collaborative content and keeping collaborators informed of changes to collaborative content that may require attention.

SUMMARY

An example computing device for organizing a collaborative workspace for a user according to the disclosure may include a processor and a machine-readable medium storing executable instructions. The instructions when executed cause the processor to perform operations including providing, using a display of the computing device, an interactive user interface associated with the collaborative workspace in which the user may work on a shared task in a coordinated fashion with other users; identifying, based on one or more factors, one or more activities specific to the user from within the collaborative workspace; assigning the identified one or more activities to a catch-up list associated with the user; displaying, within the interactive user interface, the catch-up list; detecting that at least one of the one or more activities has been addressed from within the collaborative workspace or the catch-up list; and updating, based on the detection, the collaborative workspace and the catch-up list.

An example method implemented in a computing device of organizing a collaborative workspace for a user of the computing device includes providing, using a display of the computing device, an interactive user interface associated with the collaborative workspace in which the user may work on a shared task in a coordinated fashion with other users; identifying, based on one or more factors, one or more activities specific to the user from within the collaborative workspace; assigning the identified one or more activities to a catch-up list associated with the user; displaying, within the interactive user interface, the catch-up list; detecting that at least one of the one or more activities has been addressed from within the collaborative workspace or the catch-up list; and updating, based on the detection, the collaborative workspace and the catch-up list.

An example machine-readable medium on which are stored instructions. The instructions when executed cause a processor of a programmable device to perform operations of providing, using a display of the computing device, an interactive user interface associated with the collaborative workspace in which the user may work on a shared task in a coordinated fashion with other users; identifying, based on one or more factors, one or more activities specific to the user from within the collaborative workspace; assigning the identified one or more activities to a catch-up list associated with the user; displaying, within the interactive user interface, the catch-up list; detecting that at least one of the one or more activities has been addressed from within the collaborative workspace or the catch-up list; and updating, based on the detection, the collaborative workspace and the catch-up list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
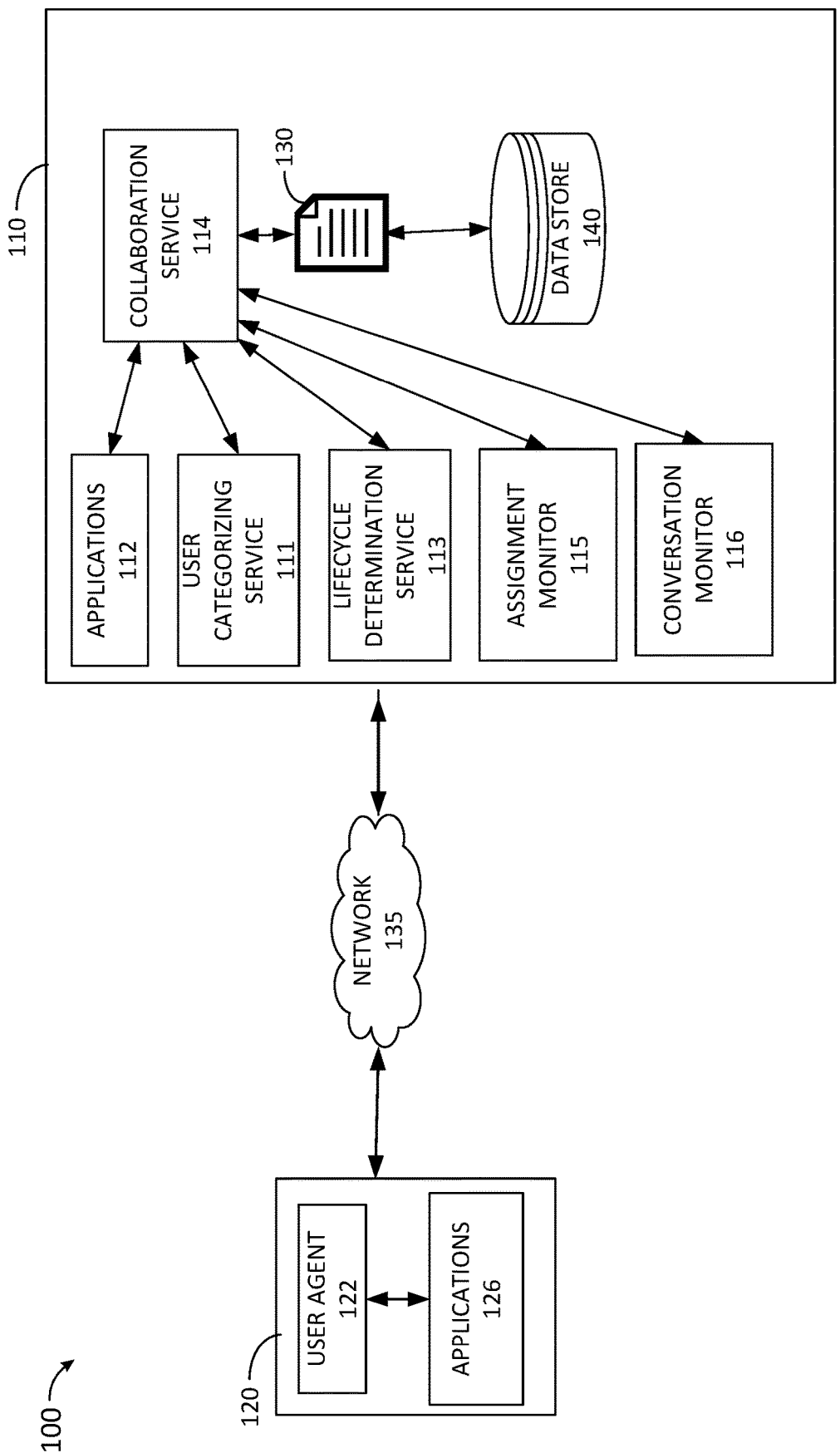
FIG. 1 depicts an example system upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

A collaborative workspace, as referred to herein, includes a software based virtual workspace where multiple users can conduct meetings, pass messages, and create various documents associated with a collaborative project. A user may participate in multiple collaborative projects and each collaborative project may be associated with a respective collaborative workspace for creating accessing, creating and/or modifying documents associated with the collaborative project, communicating with other collaborators, and/or other such activities. A "collaborator," as used herein, may refer to a potential collaborator who has accepted an invitation to contribute to the development of the document and/or a potential collaborator who has contributed to the document. A "potential collaborator," as used herein, refers to someone who may contribute to the development of a document at various lifecycle stages of the document. An author or creator of a document may invite a potential collaborator to contribute to the document.

A document may include, but is not limited to, Microsoft Word documents, Microsoft Excel spreadsheets, Microsoft PowerPoint presentations, Microsoft Visio drawings, Microsoft Fluid Framework components, web pages, community pages, message boards, blog posts, and/or documents or components generated by other types of word processing, spreadsheet, presentation, drawing or other software applications. The document may have a specific format. The format of the document may vary depending upon the subject matter of the document and how the document is intended to be used. For example, a white paper or journal article may be authored using a word processing application and saved in an electronic file format associated with that word processing application. In contrast, a presentation may be authored using a presentation application and saved in an electronic file format associated with the presentation application. The types of content that may be authored are not limited to these specific examples and may include other types of content, such as but not limited to images, videos, charts, and/or interactive content.

A document may include more than one segment, section, or component, and collaborators may contribute to one or more segments, sections, or components of the document. Moreover, different sets of collaborators may contribute to different segments, sections, or components of the document. Some components, such as Microsoft Fluid Framework components, may be associated with multiple documents across multiple platforms. For example, a component may be included in a word processing document, in a presentation, and may be shared in an email with one or more collaborators. Collaborators may make contributions to the component across multiple platforms and these contributions may be reflected in real-time or nearly real-time in each of the documents that include the component across each of the multiple platforms. Other types of file formats may be used to author other types of documents. Each type of document may be associated with specific lifecycle stages and actions that correspond with each lifecycle stage.

A document may go through multiple lifecycle stages, during each one of which one or more users may collaborate on the creation, preparation, review and/or formatting of the content of the document. In enterprises, collaborative work environments, and schools, each lifecycle stage of the document may involve various actions performed by multiple users. During these lifecycle stages, an author of the document may obtain the assistance of collaborators. For example, during a "writing lifecycle stage" of the document, the author may seek the assistance of collaborators to create content for the document and thereby expand upon the existing content of the document. For another example, during a "reviewing lifecycle stage" of the document, the author may obtain the assistance of collaborators with a relevant experience to review the document.

Collaborative workspaces can be noisy places with many of activities occurring simultaneously. A user may be a collaborator on numerous documents and may contribute to the documents at one or more lifecycle stages of the documents. The user may struggle to keep track of the state of each of these documents and whether the document requires the attention of the user in response to the contributions that have been made to the document. Moreover, the user may be part of an organization, enterprise, or school with numerous operational entities. The operational entities may include project teams, divisions, research units, business units, departments, or classes. The user may collaborate on documents associated with multiple operational entities and/or may contribute to documents associated with multiple collaborative projects. As a result, the user may struggle to manually track the progress of each these documents by individually accessing and opening each of these documents to determine whether there have been changes to the documents on which the user is a collaborator.

This approach is inefficient and may consume significant processing, memory, and/or network resources. Further, this approach may not be accurate and may lead to missed opportunities to contribute to the document, as an author or collaborator of the document may inadvertently overlook important changes to a document. To address these technical problems and others, in an example, the present disclosure provides a technical solution for monitoring a collaborative workspace and providing filtered content and activity items to a user that are relevant to that user. Accordingly, discussed in greater detail herein are systems and methods to create and update a catch-up inbox, which can automatically track activities within one or more collaborative workspaces and list items that may be of concern to a specific user. The system may also utilize activity heuristics that control the density of the activity items in the inbox. Specifically, the system may weight certain activity items that are believed to be more important or critical to the user. The system can also adjust the weighting, group items together, and/or remove items to maintain a streamlined task list.

The benefits provided by these solutions include more user-friendly applications that enable collaborators, such as authors, contributors, and/or other team members contributing to a collaborative project, to increase their efficiency by intelligently identifying projects and/or documents associated with a collaborative project which may require the user's attention and presenting these items in a catch-up inbox. The determination of whether the user's attention is required may be made based, at least in part, on the stages of the lifecycle at which the user has contributed to the document, the types of contributions that have been made by other collaborators, the current lifecycle stage of the document, and/or other factors which may be used to determine whether the user's attention to the document may be required. The technical solutions of the present disclosure can, therefore, improve user productivity and efficiency, and reduce processing, memory, and/or network resources required to identify documents on which the user is a collaborator and requires user attention.

FIG. 1 illustrates an example system 100, in which aspects of this disclosure may be implemented. The system 100 includes a server 110, a client device 120, and a network 135. The server 110 may be configured to provide a collaboration platform in which users may contribute to one or more collaborative workspaces. The server 110 may contain and/or execute a user categorizing service 111, a lifecycle determination service 113, a collaboration service 114, an assignment monitor 115, a conversation monitor 116, one or more electronic documents 130, and a data store 140. The server 110 may operate as a shared resource server located at an enterprise accessible by various computer client devices such as the client device 120. The client device 120 may include a user agent 122 and applications 126. The server 110 may also operate as a cloud-based server for offering user categorizing services 111, lifecycle determination services, and/or collaboration services. Although shown as one server, the server 110 may represent multiple servers for performing various operations. For example, the server 110 may include one or more processing servers for performing the operations of the user categorizing service 111, the lifecycle determination service 113, the collaboration service 114, the assignment monitor 115, the conversation monitor 116, the electronic documents 130, and the data store 140. The server 110 may be connected to or include the data store 140. The data store 140 may function as a repository in which documents associated with a collaborative workspace, such as the document 130, may be stored.

The applications 126 may process the electronic document 130, in response to user input through an input device, to create, to view, and/or to modify the content of the electronic document 130 and/or other content associated with a project being worked on a collaborative workspace. The applications 126 may also display or otherwise present display data to the user. The display data may include a graphical user interface (GUI) displaying the content of the electronic document 130. The GUI of the application 126 may allow the user to search for collaborators to contribute to various lifecycle stages of the document, to invite one or more identified collaborator(s) to contribute to the document, to create tasks associated with the document that identify work to be done on the electronic document 130, and/or to assign tasks to collaborators. Examples of suitable applications 126 include, but are not limited to, a document management application, a file sharing application, a word processing application, a presentation application, a note taking application, a text editing application, an email application, a spreadsheet application, a desktop publishing application, a digital drawing application and a communications application. Other types of applications may also be provided that may provide a collaborative workspace.

The server 110 may also be connected to or include one or more applications 112. The applications 112 may be representative of applications that enable a user to create, to view, and/or to modify the content of the electronic document 130 and/or other content associated with a project being worked on a collaborative workspace. As such, applications 112 may host at least a portion of the functionality of the collaboration service 114. Examples of suitable applications include, but are not limited to a word processing application, a presentation application, a note taking application, a text editing application, an email application, a spreadsheet application, a desktop publishing application, a digital drawing application, and a communications application. Other types of applications may also be provided that may provide a collaborative workspace.

The client device 120 may also access the applications 112 that are run on the server 110 and provided via an online service, as described above. In one implementation, the applications 112 may communicate via the network 135 with a user agent 122, such as a browser, executing on the client device 120. The user agent 122 may provide a GUI that allows the user to interact with application content and electronic documents stored in the data store 140. The user agent 122 may also provide a UI that enables the user to view a list of one or more documents. In some examples, the user agent 122 may be a dedicated client application that provides a UI to access documents stored in the data store 140 and/or in various other data stores. The user agent 122 may be configured to allow the user to create, view and/or modify the content of the documents using the applications 112 in a similar manner as in the application 126 described above. The applications 112 may also provide GUI elements that allow the user to search for collaborators, invite collaborators to contribute to the document, and/or assign tasks to collaborators as described with respect to the applications 126.

The user categorizing service 111 may identify a user category or categories for a collaborator to a document based on activities performed on the document by the collaborator. In an example, a collaborator who creates a new document falls into a "creator" user category. The same collaborator may also add new content to the document, and thus, fall into an "author" user category as well. Other example user categories include editor, reviewer, moderator, or reader. Although the plethora of users may help create better work product, it can cause delays and inefficiencies when one or more members of the group are not responding or updating material in a timely manner. The applications 112 and/or applications 126 may keep track of the activities performed on the document 130 and/or other content associated with a collaborative project. The activity information may be stored in the data store 140, and the user categorizing service 111 may access and analyze this information to determine a user category or categories for a collaborator. The user categorizing service 111 may utilize a machine learning model configured to receive the activity information and to output a prediction of the user category or categories for the collaborator. Other components of the server 110 may also use the activity information collected by the applications 112 and/or applications 126.

The lifecycle determination service 113 may receive information relating to the identified user categories and provide intelligent determination of a document's lifecycle stage. The lifecycle determination service 113 may also determine an activity level for the document based on the activities received as part of the usage signal. The lifecycle determination service 113 may provide the identified lifecycle stage and/or activity level to the collaboration service 114. The collaboration service 114 may use this information to identify potential collaborator(s) that are appropriate to the current lifecycle stage and/or activity level of the document. For example, if the current lifecycle stage of the document is in the reviewing stage, the collaboration service 114 may use this information to identify potential collaborator(s) that have experience reviewing documents. The lifecycle determination service 113 may analyze the activity information associated with a document to determine the lifecycle stage of the document. The lifecycle determination service 113 may utilize a machine learning model configured to receive the activity information and to output a prediction of the lifecycle state of the document and/or an activity level for the document.

The collaboration service 114 may monitor the collaborative workspace (e.g., using one of the various services or monitors) for any activities that require a user's attention. Once an activity or action item that is relevant to a specific user is identified, it can be presented to the user in a streamlined view referred to herein as a "catch-up inbox." The catch-up inbox may present one or more inbox items that identify an activity or groups of activities that may require the user's attention. Each inbox item may include an indication of the activity that occurred, one or more collaborators who are associated with the activity, and a document or documents associated with the activity (if applicable). The determination of which items are relevant to a specific user may be made based on a number of factors, such as but not limited to a mention of the user, a task assignment to the user, a task assignment by the user, a mention of a person associated with the user, a temporal characteristic, a lifecycle determination, a preference setting, or the like.

The user may be mentioned in an email, chat message, or other type of message in the collaborative workspace. In some instance, the user may be explicitly mentioned by adding a handle, username, or other reference to the user preceded by the "A" symbol or included as a recipient of the message. In other instances, the user may not be directly mentioned, but the collaboration service 114 may determine that the message is relevant because a team, group, organization, or other entity associated with the user is mentioned in the message. The user categorizing service 111 may identify such relationships. Activity associated with tasks assigned to the user by other collaborators and/or tasks assigned to the user by other collaborators may also be identified and included as an inbox item in the catch-up inbox.

The collaboration service 114 may also consider the temporal characteristics of the activities when determining whether the items are relevant. For example, the collaboration service 114 may determine when the user last contributed to a collaborative project and/or a particular content item associated with the collaborative project. The collaboration service 114 may compare the amount of time that has passed since this contribution with a temporal threshold to determine whether a particular activity is relevant to the user. Different temporal thresholds may be associated with different types of content items associated with the collaborative project. This approach can be used to draw the user's attention to activities related to their recent contributions to a collaborative project.

The collaboration service 114 may also consider the lifecycle stage of a particular content item associated with a content item when determining whether activity is relevant to the user. For example, a user who contributed during the authoring stage of a document may be interested in being notified of edits to the document and/or comments made on the document. However, a user who contributed to the document as a reviewer may not be interested in subsequent activity associated with the document. Thus, the collaboration service 114 may be configured to notify the user of activity based in part on the current lifecycle stage of the document and the lifecycle stage or stages in which the user contributed to the document.

The collaboration service 114 may also consider user preference settings when determining when to notify the user of activities associated with a collaborative project. The collaboration service 114 may provide a user interface that enables a user to select which types of activities for which they would like to receive notification and may enable the user to select the types of activities for which the user would not like to receive notification. In some implementations, the user preferences may be defined for each collaborative project. Consequently, the user may define project-specific user preference settings for each collaborative project reflects the user's interests regarding each collaborative project.

The collaboration service 114 may be configured use a machine learning model configured to receive activity information as an input and to output a prediction whether that the activity information is relevant to one or more users. The collaboration service 114 may add an inbox item to the catch-up inbox for each relevant activity or may group multiple activities together as will be discussed in the examples which follow.

The catch-up inbox provides a unique way of presenting a collaborative workspace to users. The catch-up inbox provides a mechanism for users to filter through the many activities and to provide a view of a team-based activity or activities that is relevant to a given user. Current collaborative workspaces lack a means for filtering the project content and activity related to a particular user. The catch-up inbox provided herein enables a user to pivot a collaborative workspace view to an "inbox" type of view that provides that includes only items happening across the collaborative workspace which are relevant to the user. The catch-up inbox provides a user interface that enables the user to interact with items in a similar manner as the user would interact with an inbox in an email program, messaging program, or other such communications platform. The user may interact with items in the catch-up inbox by clicking on or otherwise activating the item. The catch-up inbox may provide a multi-pane user interface that includes a first pane that provides a list of the items that have been identified as being relevant to the user and a second pane that may display content associated with a selected item. For example, the second pane may automatically display content from an electronic content item being worked on in the collaborative workspace and automatically scroll to a relevant portion of the electronic content item to call the user's attention to the relevant portion of the electronic content item.

Moreover, the catch-up inbox also provides means for the user to update items in the collaborative workspace based on the user's interactions with those items via the catch-up inbox and vice versa. For example, the user may navigate in the collaborative workspace to a task assigned to the user and mark the task as completed. The corresponding item in the catch-up inbox will also be dynamically updated in response to the user updating the task. Thus, the content items of the collaborative workspace have a two-way relationship with their corresponding items in the catch-up inbox. The user may interact with an item in the inbox to automatically navigate to the corresponding content item in the collaborative workspace. Similarly, the user may interact with a content item via the collaborative workspace, and the corresponding inbox item in the catch-up inbox is also automatically updated. In an example implementation to illustrate these concepts, user are collaborating on a project in the Microsoft Fluid real-time collaboration platform and the catch-up inbox is implemented as an email inbox feature for filtering content and activity items created within the collaborative workspace. The catch-up inbox may be included as an inbox view of an email application associated with the collaboration platform, and the catch-up inbox may present a list of items associated with content and activity relevant to the user of the email inbox. The catch-up inbox may be dynamically updated based on the user's interactions with the collaborative workspace via a two-way relationship between the items in the catch-up inbox and the collaborative workspace. This two-way relationship facilitates navigation to relevant content in the collaborative workspace and automatically update the state of the inbox item based on changes to corresponding content in the collaborative workspace and vice versa. For example, the user may mark a task as being completed by navigating the to the task in the collaborative workspace and the corresponding inbox item will also be updated to reflect the updated state of the task. Similarly, the user may navigate to the inbox item associated with the task to mark the task as completed and the corresponding task in the collaborative workspace will be update. Other implementations may be implemented in other collaborative frameworks, and the catch-up inbox may be implemented in other types of application other than an email program.

The density of the items included inbox may be controlled by activity heuristics. The different types of activity signals that are shown as items in the catch-up inbox may be assigned their own weight in terms of signal strength and representation style in the catch-up inbox. For example, if a user were to be assigned a task within the collaborative workspace, the task may appear as a new item in the catch-up inbox. The task may be assigned by another user or automatically by a process associated with the collaborative workspace, and the catch-up inbox of the user may be dynamically updated in response to the new task being assigned to the user. In another example, if another user replies to a comment made by the user on some aspect of a project being worked on within the collaborative workspace, the reply may be shown as a new entry in the catch-up inbox of the user. If subsequent replies to the comment are also received, the subsequent replies may be optionally grouped with the previous replies as a single item in the catch-up inbox of the user. For example, the collaboration service 114 may determine may group the replies into a single item inbox if the replies if a latency threshold is satisfied. The latency threshold may indicate an amount of time that may elapse between events that may indicate that the events are related and should be associated with a single item in the catch-up inbox of the user. Referring to the example of the replies associated with a comment made by the user, the collaboration service 114 may group replies received before the latency threshold elapses with the item in the inbox associated with the commend made by the user. Subsequent replies by or other activities may be associated with one or more inbox items of the catch-up inbox. This approach may reduce an amount of "noise" associated with the activities relevant to the user by grouping related activities into a single entry in the catch-up inbox.

The density of the items included inbox may be controlled at least in part based on weights assigned to the various types of activity signals that may be generated by various components of the collaborative workspace. For example, the mentioning of a user in a message exchanged between users collaborating within the collaborative workspace may be assigned a first weight and replies to a user comment may be assigned a second weight. The first and second weights may be different from one another and may be selected based on whether the items should be grouped together and represented as a single inbox item in the catch-up inbox. In some implementations, the weights associated with various activity signals may be set higher for activity signals which may be associated with a separate inbox item.

The collaboration service 114 may determine, based on the user categorizing service 111, the format of the catch-up inbox. More specifically, the user categorizing service 111 may determine that the user is unable to assign tasks, and thus the assignment monitor 115 may only need to confirm assigned tasks. Additionally, or alternatively, the user categorizing service 111 may determine that the user is a supervisor and thus the assignment monitor 115 may need to monitor tasks assigned to any of the user's subordinates. In a further embodiment, the server 110 may determine that a user requires separate catch-up inboxes (e.g., one for their activities and one for the activities of their team). Accordingly, in one or more embodiments, the server 110 may, via the assignment monitor 115, track and/or monitor all tasks/activities that are assigned to or by a user, as well as their progress toward completion. Those tasks/activities may then be presented to the user in one or more catch-up inboxes.

In further implementations, the server 110 may track and/or monitor communication within the collaborative workspace (e.g., message board posts, direct messages, meeting conversations, etc.) using the conversation monitor 116. Like the above, the conversation monitor 116 may determine that various conversation(s) are relevant to a specific user based on a plurality of factors. By way of non-limiting example, the conversation monitor 116 may determine that another user "A mentioned" the user or that a user's first or last name was mentioned. In a further embodiment, the collaboration service 114 may, based on the user categorizing service 111, determine that a particular group of users are relevant to the user (e.g., the user is the team manager or a team member) and as such, the conversation monitor 116 may identify these conversations and include them in the user's catch-up inbox.

The conversation monitor 116 may also identify relevant conversations based on context clues in the conversation as well as the user's categorization. For example, the conversation monitor 116 may identify a meeting memo/agenda that seems to relate to the companies Information Technology (IT) service. Accordingly, the conversion monitor may flag that meeting and provide it to the IT manager or the like to ensure they are aware of the meeting (i.e., to allow attendance or review of the meeting notes).

Figure 2:
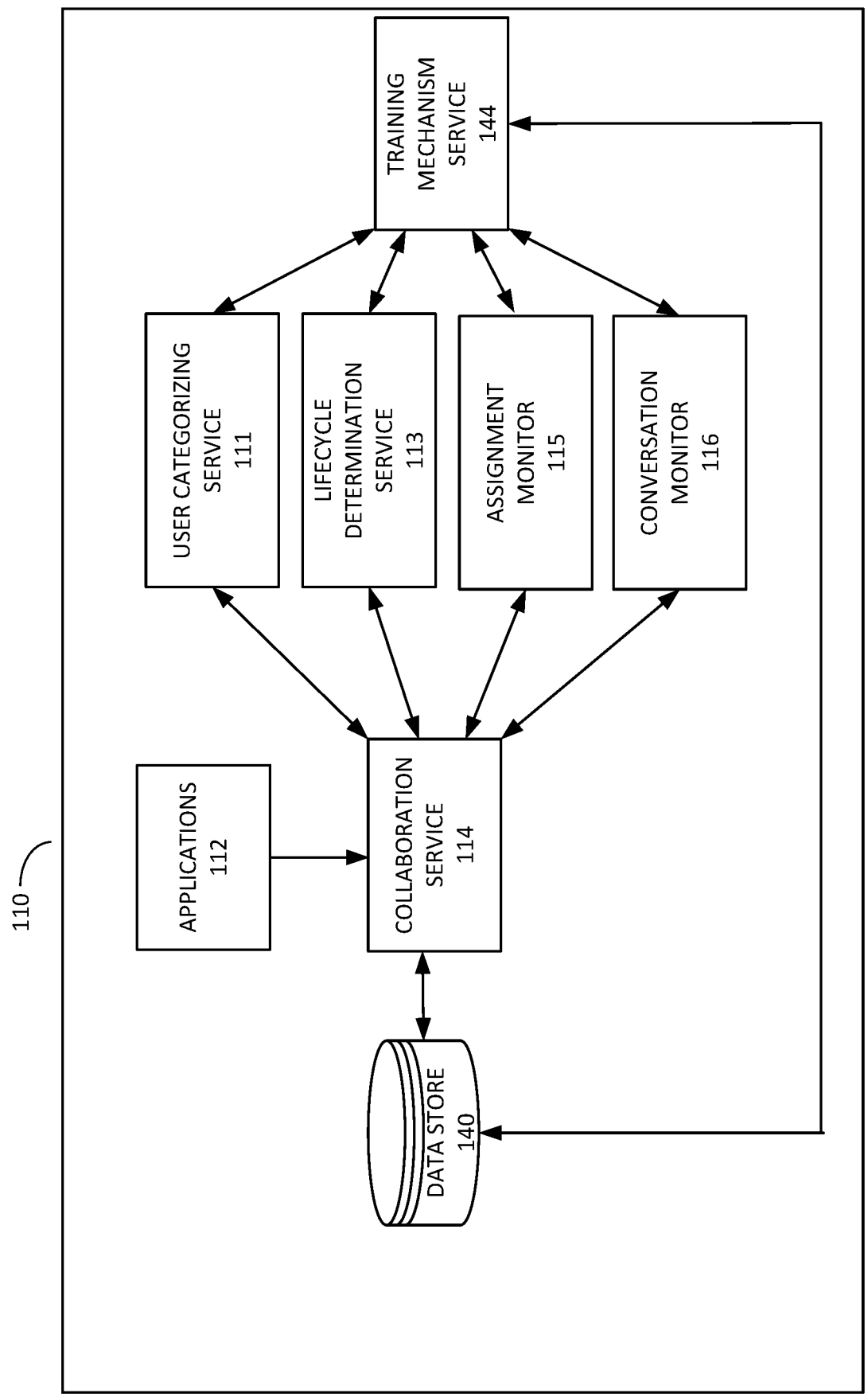
FIG. 2 depicts additional details of the example system shown in FIG. 1.

FIG. 2 is a diagram showing additional details of the server 110 shown in FIG. 1, which may implement a training mechanism service 144. The training mechanism service 144 may be configured to train one or more machine learning (ML) models that may be used by the collaboration service 114, the user categorizing service 111, the lifecycle determination service 113, the assignment monitor 115, and the conversation monitor 116. The training mechanism service 144 may use training data sets stored in the data store 140 to provide initial and ongoing training for each of the models included in the collaboration service 114, the user categorizing service 111, the lifecycle determination service 113, the assignment monitor 115, and the conversation monitor 116. Each of the collaboration service 114, the user categorizing service 111, the lifecycle determination service 113, the assignment monitor 115, and the conversation monitor 116 using corresponding data sets from the data store 140. To provide ongoing training, the training mechanism service 144 may also use training data sets received from each of the ML models. Furthermore, data may be provided from the training mechanism service 144 to the data store 140 to update one or more of the training data sets to provide updated and ongoing training. Additionally, the training mechanism service 144 may receive training data such as knowledge from public repositories (e.g., Internet), knowledge from other enterprise sources, and/or knowledge from other pre-trained mechanisms.

In addition to monitoring and collecting relevant information, the server 110 may, in some embodiments, apply a weighting factor to the items in the catch-up inbox. The weighting factor may be based on a variety of factors, such as, for example, who assigned the task, how long ago the task was assigned, the task criticality (e.g., if the assigning party specified the task as urgent, low priority, etc.), the number of tasks dependent on it, the importance of the overall project to the company/school/etc., the number of @ mentions, the number of name mentions, the user's categorization, and the like. It should be understood that although the determinations are discussed generally herein, it should be understood that the system may utilize Artificial Intelligence (AI) or Machine Learning to more accurately determine the relevant information.

Figure 3:
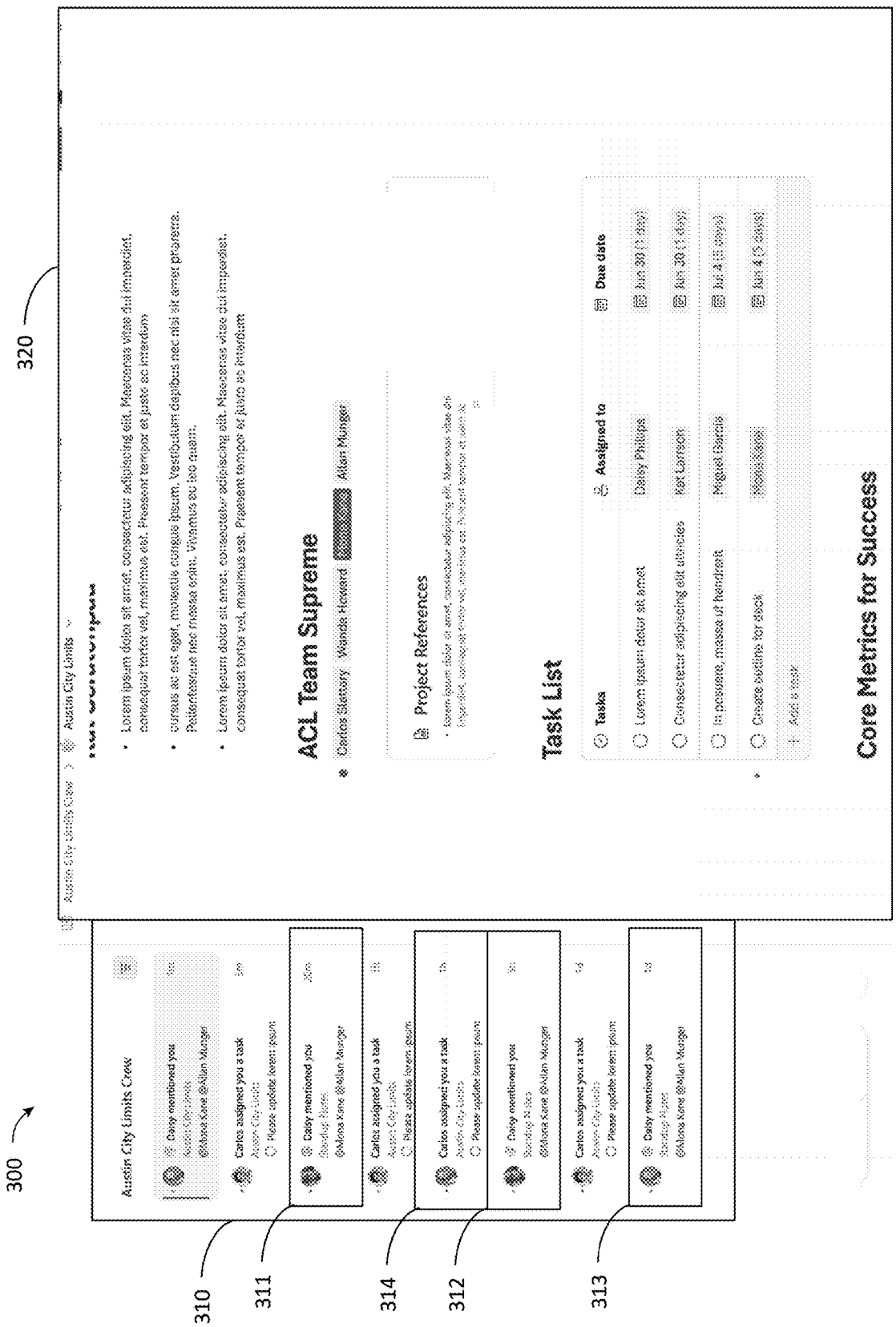
FIG. 3 depicts an example user interface for a collaborative workspace according to an embodiment.

In some embodiments, the weighting factor may be used by the collaboration service 114 to determine the order in which the items are listed in the catch-up in box. Referring to FIG. 3, an illustrative example of a collaborative user interface 300 is shown. In some embodiments, and as shown, the interface 300 may have what would be considered a standard view 320 of a collaborative workspace (e.g., including a project summary, member list, task assignments, etc.). However, as discussed herein, these interfaces can be difficult to navigate, and can cause inefficiencies or unnecessary delays as the users are unable to locate their actionable activities.

Accordingly, a catch-up in box 310 may be shown to allow a user to quickly see an overview of any recent activity in the collaborative workspace. Moreover, the activities listed in the catch-up inbox may, as discussed, be sorted or ranked based on the weighting factors. In a further embodiment, server 110 may also group various items to further streamline the view. For example, as shown in FIG. 3, the item "Daisy mentioned you" in "Standup Notes" appears three different times 311, 312, and 313. Thus, in some embodiments, the server 110 may group all three "@ mentions" (i.e., 311, 312, and 313) into a single item to reduce clutter (not shown).

Once the task list (i.e., the catch-up inbox) 310 is compiled and presented to the user, the user may select one or more items to address. For example, as shown in FIG. 3, "Carlos assigned you a task" to "Please update lorem ipsum" 314. In some implementations, a user may select (e.g., click) the assignment 314 and complete the task of updating the lorem ipsum. Accordingly, as an illustrative example of a collaborative user interface 400 shown in FIG. 4, the catch-up inbox 410 may mark that task or activity as complete 414. Moreover, in some embodiments, the updating of activities is a two-way communication.

Accordingly, although the user may have had to open a secondary application or leave the collaborative workspace to complete the task of updating the lorem ipsum, the assignment monitor 115 and/or the conversation monitor 116 is able to determine that the task was executed and thus update the catch-up inbox 410 at 414. It should be understood that some of the listed activities 310/410 may be able to be addressed without leaving the inbox. By way of non-limiting example, a user may be able to select an item from the inbox and review/approve an item from within the same interface. Accordingly, in some embodiments, the server 110 may update the inbox view, as discussed herein, but it may also update the specific collaborative page related to the project and the approval.

Figure 5:
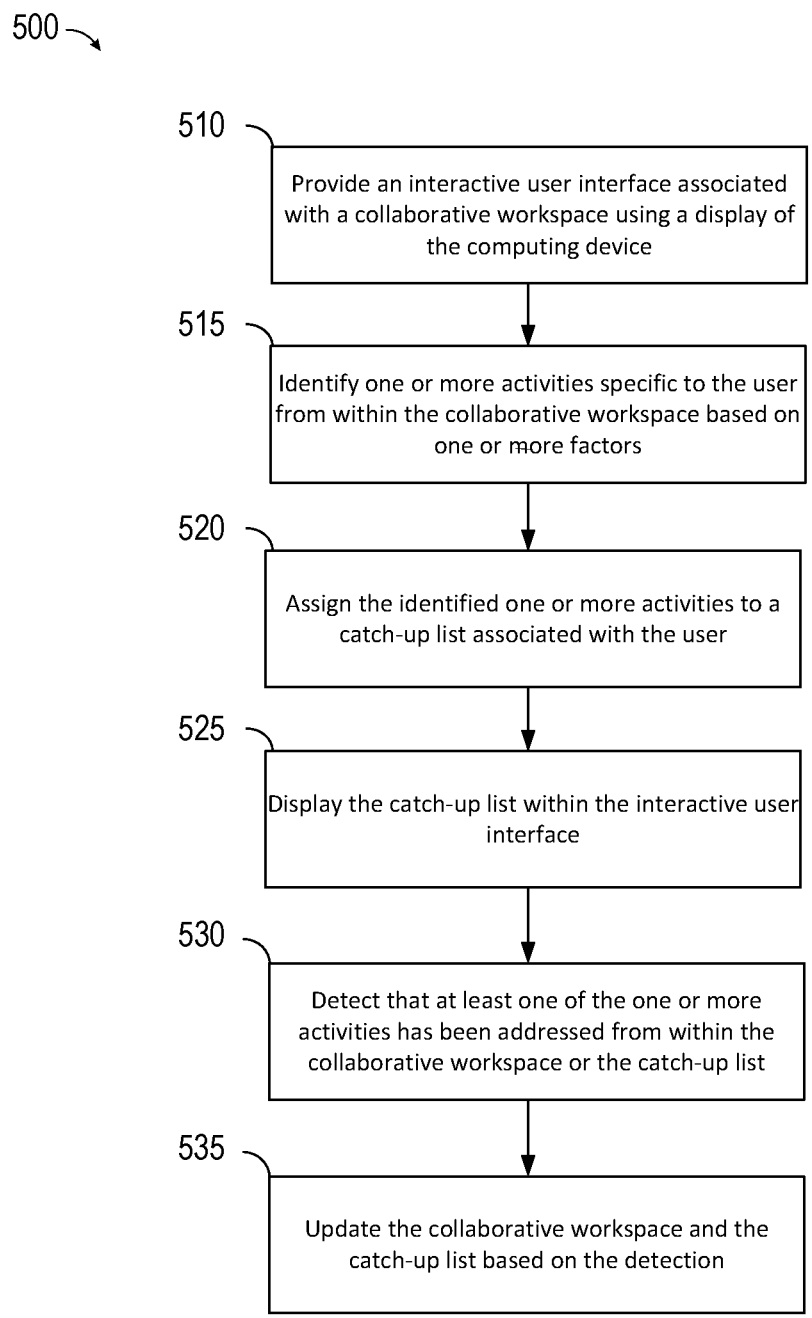
FIG. 5 is a flow diagram depicting an example method for organizing a collaborative workspace for a user.

FIG. 5 is a flow diagram depicting an exemplary method 500 for intelligently tracking collaborative content and keeping collaborators informed of changes to collaborative content. The method 500 may be implemented by the collaboration service 114 unless otherwise indicated.

Figure 4:
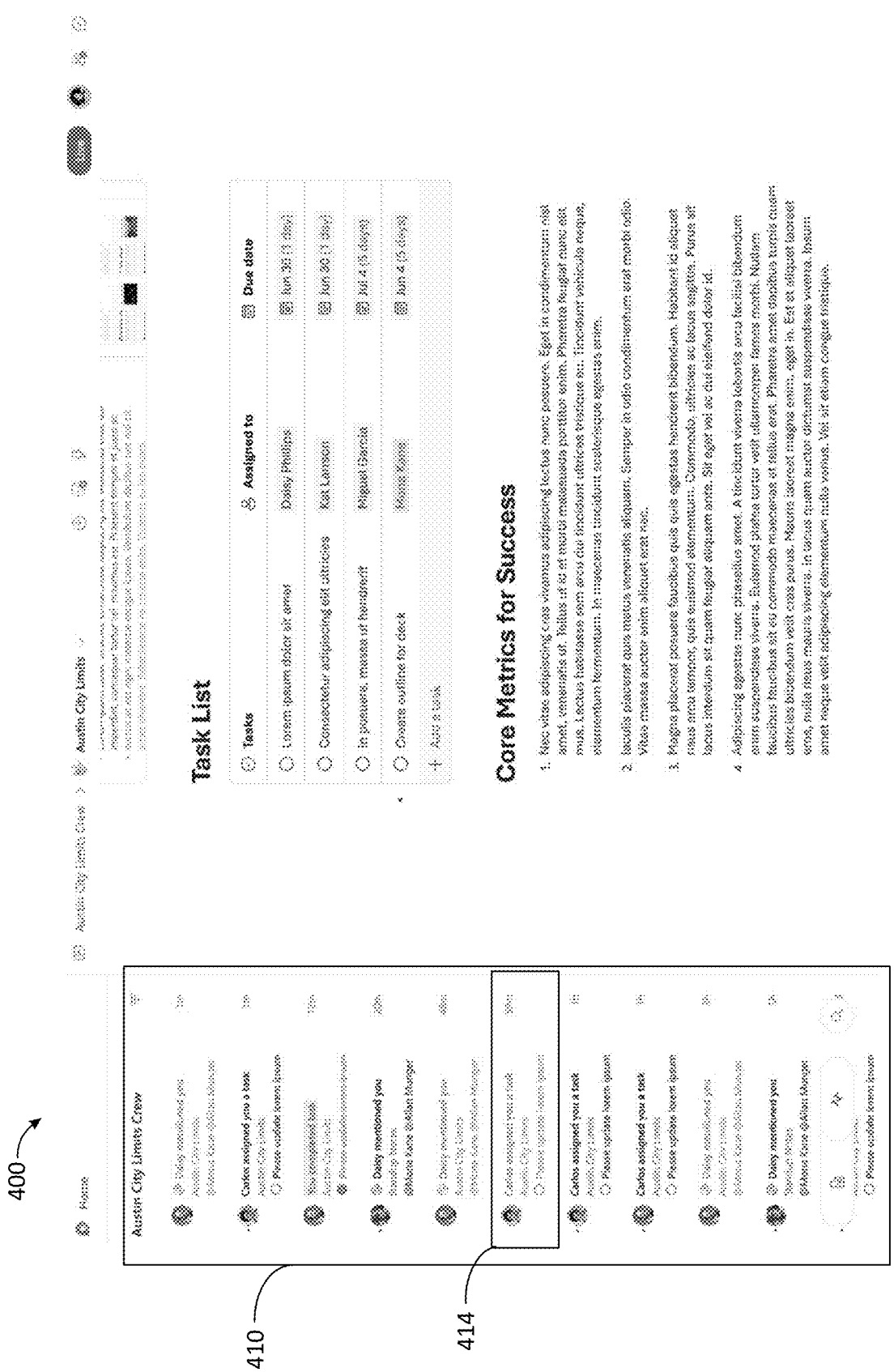
FIG. 4 depicts another example user interface for a collaborative workspace according to an embodiment.

The method 500 may include an operation 510 of providing, using a display, an interactive user interface associated with the collaborative workspace in which the user may work on a shared task in a coordinated fashion with other users. The collaboration service 114 may provide a user interface that presents various aspects of the collaborative workspace to the user. Examples of such user interfaces are shown in FIGS. 3 and 4.

The method 500 may include an operation 515 of identifying, based on one or more factors, one or more activities specific to the user from within the collaborative workspace. The collaboration service 114 may use various factors to determine whether an activity is associated with a user, such as but not limited to a mention of the user, a task assignment to the user, a task assignment by the user, a mention of a person associated with the user, a temporal characteristic, a lifecycle determination, a preference setting, and/or other factors that may indicate that the activity is associated with the user.

The method 500 may include an operation 520 of assigning the identified one or more activities to a catch-up list associated with the user. The collaboration service 114 may identify one or more activities that are relevant to the user and may include these activities in the catch-up list is presented to the user.

The method 500 may include an operation 525 of displaying, within the interactive user interface, the catch-up list. As discussed in the preceding examples, the collaboration service 114 may display a catch-up inbox that includes the list of one or more activities specific to the user. FIGS. 3 and 4 provide examples of one possible implementation of the catch-up inbox.

The method 500 may include an operation 530 of detecting that at least one of the one or more activities has been addressed from within the collaborative workspace or the catch-up list. The user may select an item from the catch-up inbox and address the activity without leaving the catch-up inbox. The user may select a task and mark the task as completed. The user may also select a document for review and provide comments on the item. The user may also select an invoice or request for review and approve or deny invoice or request. Other types of items may be included in the catch-up inbox instead of or in addition one or more the types of items described herein. The specific actions that the user may take to address a particular activity included in the inbox depends upon the type of activity being addressed. Thus, the user may take different actions to address different types of activities. The assignment monitor 115 and/or the conversation monitor 116 may be configured to determine that a particular action has ben taken by the user and to update the catch-up inbox accordingly.

The method 500 may include an operation 535 of updating, based on the detection, the collaborative workspace and the catch-up list. The collaboration service 114 may be configured to update the catch-up inbox and/or other features of the collaborative workspace responsive to the detection that at least one of the one or more activities have been addressed. The user interface presented to the user may be updated to reflect update to the collaborative workspace and the list of the one or more activities specific to the user.

Figure 6:
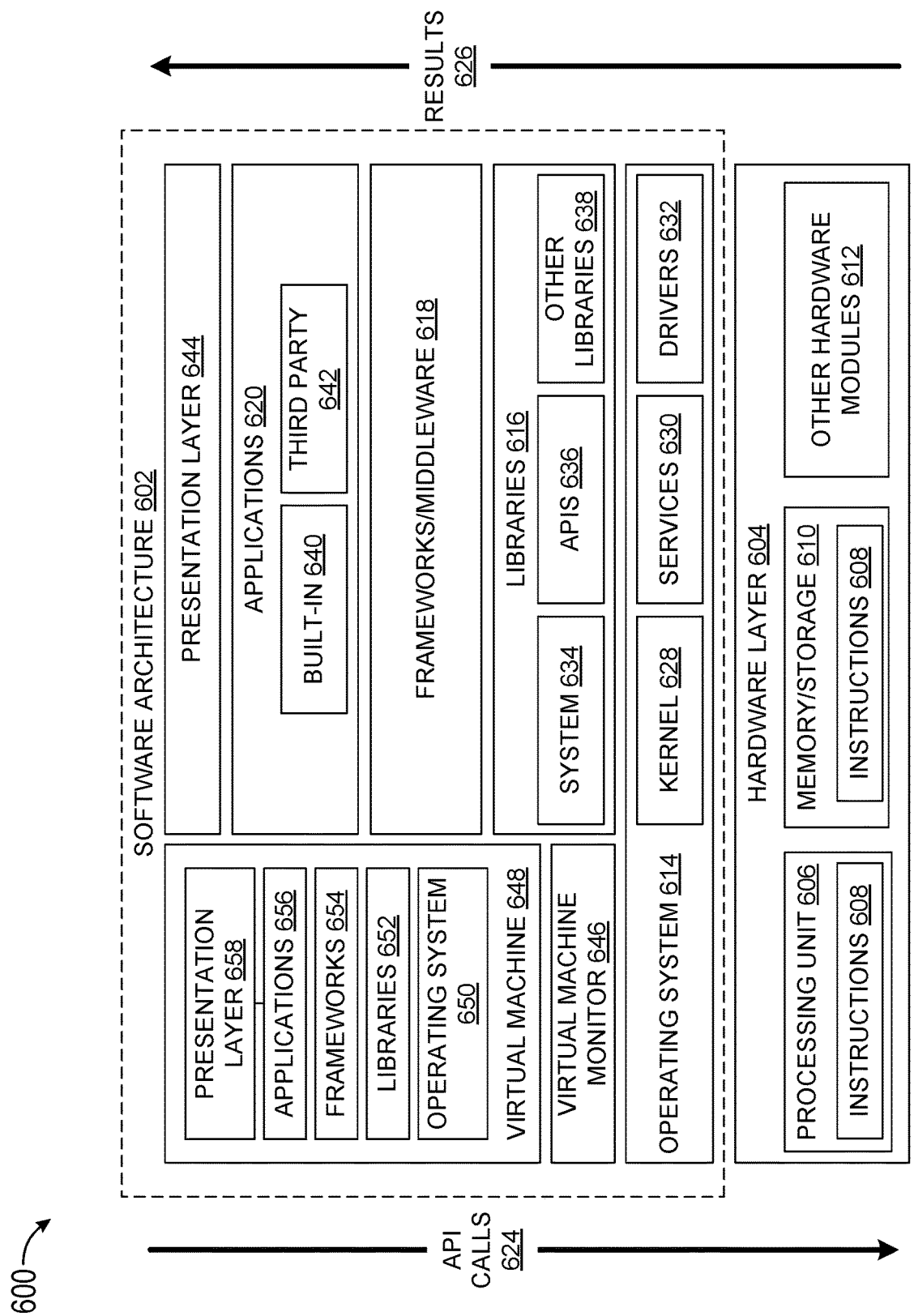
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
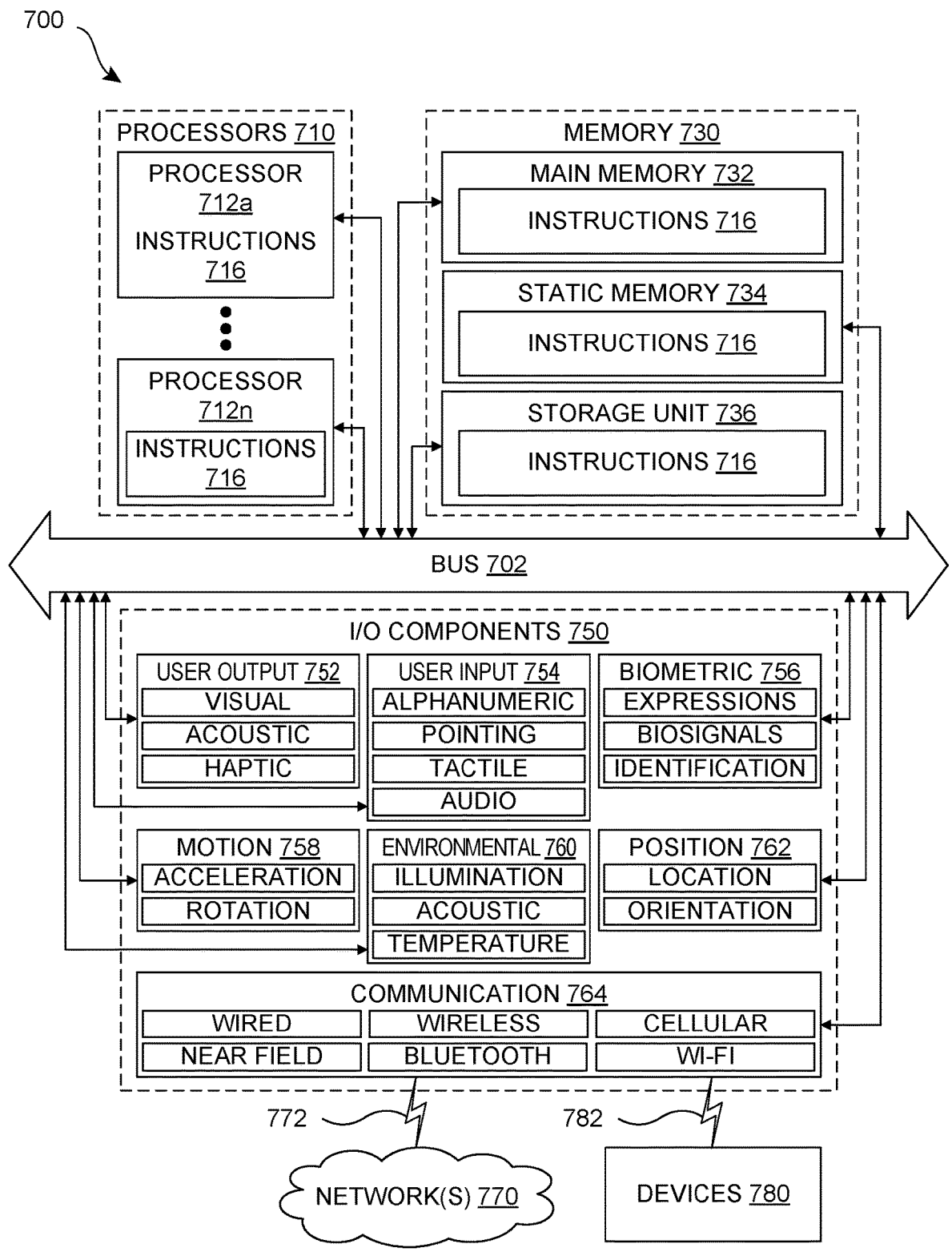
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 874 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device for organizing a collaborative workspace for a user, the computing device comprising:
   a processor; and
   a machine-readable medium storing executable instructions that, when executed, cause the processor to perform operations comprising:
   providing, using a display of the computing device, an interactive user interface associated with the collaborative workspace in which the user may work on a shared task in a coordinated fashion with other users;
   identifying, based on one or more factors, activities specific to the user in a plurality of software applications within the collaborative workspace;
   weighting the activities based on importance to the user across the plurality of software applications by applying one or more characteristics associated with the activities into a trained machine learning model;
   sorting and assigning a set of the activities to a catch-up list associated with the user based on the weighting;
   displaying, within the interactive user interface, each of the set of the activities as one entry in the catch-up list, wherein each entry includes an indication of each of the set of the activities, one or more collaborators associated with each of the set of the activities, and an indication of one or more documents associated with each of the set of the activities;
   grouping, based on respective one or more factors of a respective one of the set of the activities, different sub-sets of the set of the activities, wherein the respective one or more factors are set at least per content type;
   displaying, within the interactive user interface, the catch-up list with each of the different sub-sets of the set of the activities as one respective single entry in place of entries of the different sub-set of the activities, wherein the respective single entry includes a shared indication of the different sub-set of the activities;

detecting that at least one of the activities has been addressed from within one of the collaborative workspace or the catch-up list; and updating, based on the detection, the other one of the collaborative workspace and the catch-up list.

2. The computing device of claim 1, wherein the respective single entry further includes one or more collaborators associated with the different sub-set of the activities, and an indication of one or more documents associated with the different sub-set of the activities, and wherein the one or more factors comprise at least one of: a mention of the user, a task assignment to the user, a task assignment by the user, a mention of a person associated with the user, a temporal characteristic, a lifecycle determination, and a preference setting.

3. The computing device of claim 1, wherein the one or more characteristics associated with the activities comprise one or more of an entity assigned a task to the user, a time point when the task was assigned, criticality of the task, a number of tasks dependent on the task, importance of a project involving the user to the entity, a number of times mentioning the user, a collaborating role of the user, and wherein the one or more factors include a temporal threshold elapsing from a timing of one of the set of the activities.

4. The computing device of claim 1, wherein the updating further comprises:

updating the other one of the collaborative workspace and the catch-up list in real-time or nearly real-time with the detection.

5. The computing device of claim 1, wherein the collaborative workspace comprises a linked collection of one or more:

members,
permissions,
items,
activities,
notifications, and
messages.

6. The computing device of claim 5, wherein the plurality of software applications comprise a word processing application, a presentation application, a note taking application, a text editing application, an email application, a spreadsheet application, a desktop publishing application, a digital drawing application, and a communications application, or a combination thereof, and wherein the items comprise one or more of: word processing document items, spreadsheet document items, presentation-related document items, data items, and discussion items.

7. The computing device of claim 1, wherein the content type includes at least one of image, video, chart, or interactive content.

8. A method implemented in a computing device of organizing a collaborative workspace for a user of the computing device, the method comprising:

providing, using a display of the computing device, an interactive user interface associated with the collaborative workspace in which the user may work on a shared task in a coordinated fashion with other users;

identifying, based on one or more factors, activities specific to the user in a plurality of software applications within the collaborative workspace;

weighting the activities based on importance to the user across the plurality of software applications by applying one or more characteristics associated with the activities into a trained machine learning model;

sorting and assigning a set of the activities to a catch-up list associated with the user based on the weighting;

displaying, within the interactive user interface, each of the set of the activities as one entry in the catch-up list, wherein each entry includes an indication of each of the set of the activities, one or more collaborators associated with each of the set of the activities, and an indication of one or more documents associated with each of the set of the activities;

grouping, based on respective one or more factors of a respective one of the set of the activities, different sub-sets of the set of the activities, wherein the respective one or more factors are set at least per content type;

displaying, within the interactive user interface, the catch-up list with each of the sub-sets of the set of the activities as one respective single entry in place of entries of the different sub-set of the activities, wherein the respective single entry includes a shared indication of the different sub-set of the activities;

detecting that at least one of the activities has been addressed from within one of the collaborative workspace or the catch-up list; and updating, based on the detection, the other one of the collaborative workspace and the catch-up list.

9. The method of claim 8, wherein the respective single entry further includes one or more collaborators associated with the different sub-set of the activities, and an indication of one or more documents associated with the different sub-set of the activities, and wherein the one or more factors comprise at least one of: a mention of the user, a task assignment to the user, a task assignment by the user, a mention of a person associated with the user, a temporal characteristic, a lifecycle determination, and a preference setting.

10. The method of claim 8, wherein the one or more characteristics associated with the activities comprise one or more of an entity assigned a task to a user, a time point when the task was assigned, criticality of the task, a number of tasks dependent on the task, importance of a project involving the user to the entity, a number of times mentioning the user, a collaborating role of the user.

11. The method of claim 8, wherein the updating further comprises:

updating the other one of the collaborative workspace and the catch-up list in real-time or nearly real-time with the detection.

12. The method of claim 8, wherein the collaborative workspace comprises a linked collection of one or more:

members,
permissions,
items,
activities,
notifications, and
messages.

13. The method of claim 12, wherein the plurality of software applications comprise a word processing application, a presentation application, a note taking application, a text editing application, an email application, a spreadsheet application, a desktop publishing application, a digital drawing application, and a communications application, or a combination thereof, and wherein the items comprise one or more of: word processing document items, spreadsheet document items, presentation-related document items, data items, and discussion items.

14. The method of claim 8, wherein the content type includes at least one of image, video, chart, or interactive content.

15. A machine-readable medium on which are stored instructions that, when executed, cause a processor of a programmable device to perform operations of:
   providing, using a display of a computing device, an interactive user interface associated with a collaborative workspace in which a user may work on a shared task in a coordinated fashion with other users;
   identifying, based on one or more factors, activities specific to the user in a plurality of software applications within the collaborative workspace;
   weighting the activities based on importance to the user across the plurality of software applications by applying one or more characteristics associated with the activities into a trained machine learning model;
   sorting and assigning a set of the activities to a catch-up list associated with the user based on the weighting;
   displaying, within the interactive user interface, each of the set of the activities as one entry in the catch-up list, wherein each entry includes an indication of each of the set of the activities, one or more collaborators associated with each of the set of the activities, and an indication of one or more documents associated with each of the set of the activities;
   grouping, based on respective one or more factors of a respective one of the set of the activities, different sub-sets of the set of the activities, wherein the respective one or more factors are set at least per content type;
   displaying, within the interactive user interface, the catch-up list with each of the sub-sets of the set of the activities as one respective single entry in place of entries of the different sub-set of the activities, wherein the respective single entry includes a shared indication of the different sub-set of the activities;
   detecting that at least one of the activities has been addressed from within one of the collaborative workspace or the catch-up list; and
   updating, based on the detection, the other one of the collaborative workspace and the catch-up list.

16. The machine-readable medium of claim 15, wherein the plurality of software applications comprise a word processing application, a presentation application, a note taking application, a text editing application, an email application, a spreadsheet application, a desktop publishing application, a digital drawing application, and a communications application, or a combination thereof, and
   wherein the one or more factors comprise at least one of: a mention of the user, a task assignment to the user, a task assignment by the user, a mention of a person associated with the user, a temporal characteristic, a lifecycle determination, and a preference setting.

17. The machine-readable medium of claim 15, wherein the one or more characteristics associated with the activities comprise one or more of an entity assigned a task to a user, a time point when the task was assigned, criticality of the task, a number of tasks dependent on the task, importance of a project involving the user to the entity, a number of times mentioning the user, a collaborating role of the user.

18. The machine-readable medium of claim 17, wherein the updating further comprises:
   updating the other one of the collaborative workspace and the catch-up list in real-time or nearly real-time with the detection.

19. The machine-readable medium of claim 15, wherein the respective single entry further includes one or more collaborators associated with the different sub-set of the activities, and an indication of one or more documents associated with the different sub-set of the activities, and
   wherein the collaborative workspace comprises a linked collection of one or more: members, permissions, items, activities, notifications, and messages.

20. The machine-readable medium of claim 15, wherein the content type includes at least one of image, video, chart, or interactive content.

\* \* \* \* \*